United States Patent [19]

Furukawa et al.

[11] 4,076,861
[45] Feb. 28, 1978

[54] MAGNETIC RECORDING SUBSTANCE

[75] Inventors: Masahiko Furukawa; Hiroshi Ogawa; Masashi Aonuma; Yasuo Tamai; Hiromi Nakahara; Masaaki Igarashi, all of Odawara, Japan

[73] Assignee: Fuji Photo Film Co., Ltd., Japan

[21] Appl. No.: 646,597

[22] Filed: Jan. 5, 1976

[30] Foreign Application Priority Data

Jan. 14, 1975 Japan .................................. 50-5895

[51] Int. Cl.$^2$ ........................... C22C 1/00; H01F 1/02
[52] U.S. Cl. .................................. 427/132; 75/.5 AA; 148/105; 252/62.54
[58] Field of Search ..................... 148/105; 75/.5 AA; 252/62.53, 62.54, 62.55, 62.56, 62.57, 62.58; 427/127, 128, 130, 132

[56] References Cited

U.S. PATENT DOCUMENTS

| 3,704,152 | 11/1972 | Hartmann et al. | 252/62.54 |
|---|---|---|---|
| 3,713,887 | 1/1973 | Stimson | 252/62.54 |
| 3,756,866 | 9/1973 | Parker et al. | 148/105 |
| 3,781,210 | 12/1973 | Lohoff | 252/62.54 |
| 3,788,996 | 1/1974 | Thompson | 252/62.54 |
| 3,902,888 | 9/1975 | Aonuma et al. | 75/.5 AA |

*Primary Examiner*—Walter R. Satterfield
*Attorney, Agent, or Firm*—Wenderoth, Lind & Ponack

[57] ABSTRACT

This invention relates to a magnetic recording substance comprising a support and a magnetic layer containing a ferromagnetic metal powder of liquid phase reduction type in a binder, the ferromagnetic metal powder being obtained by mixing an aqueous slurry containing the ferromagnetic metal powder with an organic solvent capable of forming a minimum boiling azeotropic mixture with water and subjecting the mixture to distillation to remove the water.

8 Claims, No Drawings

MAGNETIC RECORDING SUBSTANCE

BACKGROUND OF THE INVENTION

This invention relates to a magnetic recording substance and more particularly, it is concerned with a magnetic recording substance having an excellent dispersibility, surface property and magnetic property, which is obtained by subjecting an alloy fine powder of liquid phase reduction type to a special treatment.

In a magnetic recording substance provided with a magnetic layer on a support, a magnetic paint comprises, as main components, a ferromagnetic powder, binder and coating solvent and, optionally, other additives such as dispersing agents, lubricants and abrasives. Methods of preparing such a magnetic paint are disclosed in Japanese Patent Publication Nos. 186/1968, 28043/1972, 28045/1972, 28046/1972, 28048/1972 and 31445/1972.

Ferromagnetic materials used in magnetic recording substances such as audio tapes, video tapes, memory tapes, magnetic sheets and magnetic cards are fine powders of ferromagnetic iron oxides, cobalt ferrite, ferromagnetic chromium dioxide and ferromagnetic metals or thin films of ferromagnetic metals. These magnetic recording substances have been used in a wide variety of technical field wherein electric or magnetic signals are recorded and reproduced and, of late, a system of recording, in particular, a short wavelength signal in a high density, has been watched with keen interest. Accordingly, magnetic recording properties suitable for high density recording, for example, a considerably high coercive force and large residual magnetic flux density are required for ferromagnetic materials. Moreover, it is necessary, for example, for magnetic cards, that demagnetization due to heating or pressing is be little. Metallic ferromagnetic materials have been considered most promising for high density recording with low demagnetization.

On the other hand, the recording wavelength in a video tape is much shorter than in a sound recording. For example, in a VTR (video tape recorder) for broadcasting, a short wave to a minimum wavelength of 6 microns has to be recorded. However, the above described oxide-type magnetic substances are not as suitable for magnetic recording of a signal of short recording wavelength (about 10 microns or less), because their magnetic properties such as coercive force (Hc) and residual magnetic flux density are insufficient for high density recording. Furthermore, recording and reproducing mechanisms have lately been miniaturized and simplified and, in addition to VTR of rotary head type used in the prior art, a small VTR of fixed head type has been developed. In such a fixed head VTR, it is particularly important to lower the relative speed between a tape and head. That is to say, the minimum recording wavelength is preferbly at most 2 microns or less in order to prevent a video tape from high speed transporting in a small VTR.

Development of ferromagentic metal powders having properties suitable for high density recording has lately been carried out actively. The following methods are known as a method of preparing the ferromagnetic metal powder:

1. A method comprising heat-decomposing an organic acid salt of a metal capable of forming a ferromagnetic material, for example, oxalate and reducing with a reducing gas, for example, hydrogen gas. This method is described in, for example, Japanese Patent Publication Nos. 11412/1961, 22230/1961, 14809/1963, 3807/1964, 8026/1965, 8027/1965, 15167/1965, 16899/1965 (U.S. Pat. No. 3,186,829), 12096/1966, 14818/1966 (U.S. Pat. No. 3,190,748), 24032/1967, 3221/1968, 22394/1968, 29268/1968, 4471/1969, 27942/1969, 38755/1971, 38417/1971, 41158/1972 and 29280/1973.

2. A method comprising reducing a needle-like iron oxyhydride, substance containing metals other than iron as well as the above oxhydride or needle-like iron oxide derived from the oxyhydride. This method is described in, for example, Japanese Patent Publication Nos. 3862/1960 11520/1962, 20335/1964, 20939/1964, 24833/1971, 29706/1972, 30477/1972 (U.S. Pat. No. 3,598,568), 39477/1972, Japanese Patent Application (OPI) Nos. 5057/1971, and 7153/1971, Japanese Patent Publication No. 24952/1973, Japanese Patent Application (OPI) Nos. 79153/1973 and 82395/1973 and U.S. Pat. Nos. 3,607,220, 3,681,018, 3,598,568 and 3.702,270, British Patent No. 1,192,167 and DOS No. 2,130,921.

3. A method comprising evaporating a ferromagnetic metal in a low pressure inert gas. This method is described in, for example, Japanese Patent Publication Nos. 2560/1971, 4131/1972, 27718/1972, Japanese Patent Application (OPI) Nos. 25662/1973 to 25665/1973, 31166/1973, 55400/1973 and 81092/1973.

4. A method comprising heat-decomposing a metal carbonyl compound. This method is described in Japanese Patent Publiction Nos. 1004/1964, 3415/1965 and 16868/1970 and U.S. Pat. Nos. 2,983,997, 3,172,776, 3,200,007 and 3,228,882.

5. A method comprising electrodepositing a ferromagnetic metal powder using a mercury cathode and then separating the metal powder from mercury. This method is described in Japanese Patent Publication Nos. 12910/1960, 3860/1961, 5513/1961, 787/1964, 15525/1964, 8123/1965, 9605/1965 (U.S. Pat. No. 3,198,717), 19661/1970 (U.S. Pat. No. 3,156,650) and U.S. Pat. No. 3,262,812.

6. A method comprising reducing a solution containing a metal salt capable of forming a ferromagnetic metal powder by adding thereto a reducing agent, for example, borohydride compound, phosphinate or hydrazine. This method is described in, for example, Japanese Patent Publication Nos. 20520/1963, 26555/1963, 20116/1968, 9869/1970, 14934/1970, 7820/1972, 16052/1972, 41718/1972 and 4719/1972 (U.S. Pat. No. 3,607,218), Japanese Patent Application (OPI) Nos. 1353/1972 (U.S. Pat. No. 2,756,866), 1363/1972, 42252/1972, 42253/1972, 44194/1973, 79754/1973 and 82396/1973 and U.S. Pat. Nos. 3,206,338, 3,494,760, 3,535,104, 3,567,525, 3,661,556, 3,663,318, 3,672,867 and 3,726,664.

The present invention is suitable for ferromagnetic metal powders obtained by the methods (4), (5) and (6) of the above described six methods, in particular, obtained by the liquid phase reduction method (6) wherein a borohydride compound or phosphinate is used as a reducing agent.

In the magnetic recording substance of the foregoing type, a ferromagnetic metal powder is dispersed in an organic binder and, in the case of obtaining the ferromagnetic metal powder by the liquid phase reduction method, threfore, it is necessary to remove water therefrom.

As a method of dehydrating such a ferromagnetic metal powder, there are the following methods:

1. A method comprising heating and drying in the air or, if necessary, in an atmosphere of nitrogen.
2. A method comprising drying in vacuo.
3. A method comprising extracting water with an organic solvent miscible with water, for example, alcohol or acetone and then substituting by another organic solvent used in dispersing in a binder. These methods have disadvantages as follows: In the first method, a ferromagnetic metal powder tends to be oxidized or fired during drying and further to absorb moisture during storage after the drying. In the second method, the drying efficiency is low and a ferromagnetic metal powder tends to fire after drying and to absorb moisture during storage. The third method needs large amounts of organic solvents during water extracting and substituting and is thus disadvantageous in respect of the processing cost and effective utilization of resources.

SUMMARY OF THE INVENTION

It is an object of the invention to provide a magnetic recording substance having an excellent dispersibility, surface property and magnetic property.

It is another object of the invention to provide a magnetic recording substance having a magnetic layer containing a ferromagnetic metal powder of liquid phase reduction type subjected to a particular treatment.

It is a further object of the invention to provide a ferromagnetic metal powder whose properties are improved by removing water from a water-containing ferromagnetic metal powder using an organic solvent.

These objects can be attained by a magnetic recording substance comprising a support and a magnetic layer containing a ferromagnetic metal powder of liquid phase reduction type in a binder, the ferromagentic metal powder being obtained by mixing an aqueous slurry containing the ferromagnetic metal powder with an organic solvent capable of forming a minimum boiling azeotropic mixture with water and subjecting the mixture to distillation to remove the water.

DETAILED DESCRIPTION OF THE INVENTION

We, the inventors, have succeeded in obtaining a ferromagnetic metal powder holding the properties immediately after the reducing reaction without oxidation by subjecting a water-containing ferromagnetic metal powder to distillation in an organic solvent capable of forming a minimum boiling azeotropic mixture with water to form the minimum boiling azeotropic mixture and to distill off the organic solvent and water and thus removing the water.

The ferromagnetic metal powder of liquid phase reduction type which can be used in the present invention is ordinarily prepared by reducing an aqueous solution of a metal salt capable of forming a ferromagnetic metal powder by a reducing agent. The metal salt capable of forming ferromagnetic metal powder used herein is a salt containing, as a main component, iron, cobalt, nickel, iron-cobalt, iron-nickel, cobalt-nickel or iron-cobalt-nickel and, optionally, a minor amount of one or more salt of lanthanum, cerium, neodymium, samarium, aluminum, sulfur, chromium, manganese, copper, tin and zinc to improve the magnetic property and oxidation stability. Examples of these metal salts are sulfates, chlorides, nitrates, formates, acetates, sulfamates and pyrophosphates.

As the reducing agent for effecting the reducing reaction, there can generally be used one or more of acids or salts containing hypophosphite ion, borohydride compounds such as sodium borohydride, borane and borazane or derivatives thereof, hydrazine or derivatives thereof and reducing gases such as hydrogen and carbon monoxide. The above described metal salt is reduced by this reducing agent to precipitate the corresponding ferromagnetic metal or alloy.

To the metal salt solution can be added, in addition to the above described materials, a complexing agent, pH buffer and pH regulator as occasion demands. Useful examples of the pH buffer or complexing agent are monocarboxylic acids such as formic acid, acetic acid, propionic acid, butyric acid, valeric acid, acrylic acid, trimethylacetic acid, benzoic acid and chloroacetic acid or their salts. Useful examples of the complexing agent are dicarboxylic acids such as oxalic acid, succinic acid, malonic acid, maleic acid, itaconic acid and p-phthalic acid or their salts and oxycarboxylic acids such as glycolic acid, lactic acid, salicylic acid, tartaric acid and citric acid or their salts. Furthermore, boric acid, carbonic acid, sulfurous acid, etc. are used as a pH buffer and other inorganic acids, organic acids, ammonia and caustic alkalis are used as a pH regulator. These additives have one or more effects and their effects are not only limited to the above described ones. For example, some compounds act as not only a complexing agent but also a pH buffer.

The reaction conditions during reducing are not particularly limited but, preferably, the reaction pressure is 0.5 to 5 atmospheres and the reaction temperature and pH depend on a reducing material used. Preferably, the reaction temperature 65° to 90° C and pH is 8 to 12 in the system of phosphinic acid, the temperature is $-5°$ to 60° C and pH is 1 to 12 in the system of a borohydride compound and the temperature is 60° to 100° C and pH is 7.5 to 12 in the system of hydrazine. The wet process reduction is ordinarily carried out in a magnetic field of several ten oersteds or more. A DC magnetic field, AC magnetic field or pulse magnetic field is effective.

The concentration of a metal ion should be adjusted to such as not to give its supersaturation or less. If the concentration is too high, various problems arise that the properties of the resultant powder are deteriorated, the reaction yield is lowered and enlargement of the reaction apparatus becomes necessary due to foaming, whilst, if the concentration is too low, the powder yield is lowered resulting in lowering of the production efficiency on a commercial scale and enlargement of the reaction apparatus is thus necessary. In the present invention, the concentration of a metal ion is ordinarily in the range of 0.002 to 4 mols/l, preferably 0.01 to 2 mols/l.

It is found that the ferromagnetic powder obtained by the abovedescribed method consists of particles each having a particle size of about 50 to 1,000 Angstroms, several to several ten particles of which are aggregated to give a yarn-like, rod-like or necklace-like shape.

Heating of the resulting ferromagnetic powder in a non-oxidizing atmosphere or heat-treatment of the same in the presence of a trace amount of water or oxygen is effective for raising further the magnetic properties of a powder obtained by the present invention, as disclosed in Japanese Patent Publication Nos. 3862/1960, 26555/1963, 9869/1970 and 16052/1972.

In the present invention, the magnetic powder contains preferably iron as a main component, particularly 50% by weight of iron based on the whole metal, more particularly 60 to 90% by weight of iron. Incorporation of cobalt, nickel and chromium, particularly, 4 to 30% of cobalt and 0.5 to 10% of chromium is desirable. These numeral limitations are ordinarily determined in view of the balance of a coercive force, weatherproof properties and saturated magnetization, as disclosed in Japanese Patent Application (ODI) No. 41506/1975.

In the present invention, to an aqueous solution containing a ferromagnetic metal powder is added an organic solvent capable of forming a minimum azeotropic mixture with water in such a water to organic solvent ratio that the organic solvent be in excess of the azeotropic composition and the mixture is distilled in a suitable rectifying column, whereby the water and organic solvent in the still are distilled off as the azeotropic composition from the top of the column. The water content in the still can markedly be decreased by this process, since the water content of the azeotropic composition is higher than that in the still.

Where a mixture of an aqueous ferromagnetic metal powder slurry and organic solvent forms a uniform phase at the boiling point, the water in the slurry and adsorbed on the metal powder is dissolved in the organic solvent and then removed from the top of the column as an azeotrope of water-organic solvent, while the metal powder is finally dispersed in the organic solvent. Where a mixture of an aqueous ferromagnetic metal powder slurry and organic solvent forms two phase at the boiing point, the water and organic solvent are also removed from the top of the column in the form of an azeotrope. The aqueous phase vanishes finally and the water dissolved in the organic solvent is also removed from the system. During the same time, the metal powder initially dispersed in the aqueous phase is removed into the organic solvent phase and dispersed therein.

Any organic solvents capable of forming a minimum boiling azeotropic mixture with water can be used in the present invention individually or in combination. In cases where a mixture of two or more organic solvents is used, the mixing ratio of an aqueous ferromgnetic metal powder slurry and two or more organic solvents should be so adjusted that, upon distillation, an azeotropic composition of water-organic solvent is distilled off and the water is thus removed.

The water content in an organic solvent containing a ferromagnetic metal powder can markedly be decreased by this processing and it is ordinarily reduced to 1% by weight or less, particularly 0.4% by weight of less.

As occasion demands, the dispersibility of a ferromagnetic metal powder in an organic solvent can be improved by adding a surfactant for rendering hydrophobic to an aqueous slurry of the ferromagnetic metal powder before mixing with the organic solvent or by adding such a surfactant to the organic solvent.

The organic solvent capable of forming a minimum boiling azeotropic mixture with water, which can be used in the present invention, has ordinarily a boiling point of 30° to 250° C. Useful examples of the organic solvent are esters such as butyl formate, ethyl acetate and butyl acetate, aromatic hydrocarbons such as benzene, toluene, xylene and ethylbenene, alcohols such as butyl alcohol and amyl alcohol, aliphatic hydrocarbons such as hexane and heptane, halogenated hydrocarbons such as methylene chloride, chloroform and ethylene chloride, ethers such as isopropyl ether, butyl ether and diisoamyl ether and ketones such as methyl ethyl ketone and methyl isobutyl ketone. The boiling point of the organic solvent is not particularly limited, but a boiling point range of 30° to 250° C is preferable since if lower than 30° C, the workability is deteriorated and if higher than 250° C, contamination taking place in tape making results in a poor dryness or in exuding and running troubles. Some of these organic solvents have the following azeotropic temperature (° C) at 760 mmHg and water content (% by weight) in an azeotropic mixture:

Butyl Acetate (90.2° C, 28.7% by weight),
m-Xtlene (92° C, 35.8% by weight),
Isoamyl Alcohol (95.15° C, 49.6% by weight)
Chloroform (56.1° C, 2.8% by weight),
Butyl Ether (92.9° C, 33% by weight),
Methyl Isobutyl Ketone (87.9° C, 24.3% by weight).

In three or more component systems of azeotrope containing water, the azeotropic temperature at 760 mmHg and weight ratio of azeotrope are as follows:

Water (A)-Benzene(B)-Methyl Ethyl Ketone(C) (68.9° C, A:B:C = 8.9:73.6:17.5)
Water(A)-1-Butyl Alcohol(B)-Butyl Acetate (C) (89.4° C, A:B:C = 37.3:27.4:35.3)
Water(A)-Ethylene Chloride(B)-Ethyl Alcohol(C) (66.7° C, A:B:C = 5:78:17)
Water(A)-1-Pentyl Alcohol(B)-Amyl Acetate(C) (94.8° C, A:B:C = 56.2:33.3:10.5)
Water(A(-1-Propyl Alcohol (B)-Benzene(C) (66.51° C, A:B:C = 7.5:18.7:73.8).

The rectifying operation to remove water can be carried out under reduced or raised pressure. The weight ratio of a magnetic substance and water is in the range of 100 : 1 to 1 : 50 in the present invention, but the process efficiency is of course higher when there is more magnetic substance and less water. The water to organic solvent ratio is preferably 30 : 1 to 1 : 100 by weight, particularly 20 : 1 to 1 : 50 by weight. These specifications are not practical limitations but economical limitations depending upon the working efficiency and quantity of an organic solvent used. At the distillation, it is desirable to apply a stirring, vibrating or shaking movement to a mixture. The excessive amount of an organic solvent in an azeotrope is preferably in the range of $1 \times X$ to $3 \times X$, particularly $2.5 \times X$ or less, where the azeotropic composition ratio of water : organic solvent is 1 : X, for the purpose of lowering the water content and increasing the efficiency of the afterprocessing.

In the distillation apparatus used in the invention, stirring, shaking or vibrating can be added to a mixture distilled at the still portion or bottom portion. A plate column or packed column using Raschig rings or beri saddles is used as the rectifying column. If necessary, the distilled solvent can be refluxed. Feeding of a mixture to a distilling apparatus can be carried out continuously, intermittently or batchwise, but a continuous feeding or batchwise feeding is desirable. Even if the water to organic solvent ratio before distillation is larger than the azeotropic composition, furthermore, it is of course possible to effect the above described operation for removing water after adding the organic solvent or a mixture of water and the organic solvent during distillation so that the quantity of the organic solvent in the still may be greater than the azeotropic composition.

According to the present invention, an aqueous ferromagnetic metal powder slurry is not so contacted with air during removing water therefrom and, consequently, lowering of Bm due to oxidation scarcely takes place. In addition, the ferromagnetic metal powder processed can be stored in the organic with a very small amount of water, so lowering of Bm due to oxidation during storage scarcely takes place. Since the processings are all carried out in liquid phase, there is no breakage of particles by physical shock, nor deterioration of magnetic properties (lowering of coercive force, lowering of saturated magnetization). It is not necessary to handle a ferromagnetic metal powder in vacuo or in an inert gas so as to prevent it from oxidation. Furthermore, it is found that the dispersibility of a metal fine powder in a binder resin as well as the surface property of the magnetic layer are improved due to a small quantity of water absorbed on the metal powder dispersed in an organic solvent.

In a preferred embodiment of the invention, a surfactant is used for the purpose of rendering the surface of a metal fine powder hydrophobic, as described above. As such a surfactant there can be used anoionic surfactants such as higher fatty acid alkali salts, higher alcohol sulfuric acid esters, sulfated oils, sulfated fatty acid esters, sulfated fatty acids, sulfated olefins, alkylbenzenesulfonates, alkylsulfonates, alkylarylsulfonates and salt of sulfosuccinate, cationic surfactants such as quaternary ammonium salts of higher amine and hydrochloric acid, alkylpyridinium halides and quaternary ammonium salts, nonionic surfactants such as polyethylene glycol alkyl ethers, polyethylene glycol fatty acid esters, ethylene oxide adducts of higher aliphatic amines, ethylene oxide adducts of fatty acid amides, ethylene oxide adducts of polypropylene glycol and fatty acid esters of polyhydric alcohols and amphoteric surfactants such as lecithin, amino acids and alkyldimethylbetaines. These surfactants are preferably used in a proportion of 0.1 to 100 parts by weight, particularly 1 to 60 parts by weight per 1000 parts by weight of the whole mixture.

Suitable binders which can be used in the present invention include hitherto known thermoplastic resins, thermosetting resins and mixtures thereof.

Suitable thermoplastic resins are those resins which have a softening point of about 150° C or less, a mean molecular weight of about 10,000 to 200,000, and a degree of polymerization of the order of about 200 to 2,000, for example, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinyl butyral, cellulose derivatives such as cellulose acetate butyrate, cellulose diacetate, cellulose triacetate, cellulose propionate, cellulose nitrate and the like, a stryene-butadiene copolymer, a polyester resin, a chlorovinyl ether-acrylate copolymer, an amino resin, various synthetic rubber based thermoplastic resins and mixtures thereof.

Suitable examples of these resins which can be used are described in Japanese Patent Publication Nos. 6877.1962, 12528/1964, 19282/1964, 5349/1965, 20907/1965, 9463/1966, 14059/1966, 19685/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid salt copolymer and a diisocyanate prepolymer, a mixture of a polyesterpolyol and a polyisocyanate, a ureaformaldehyde resin, a mixture of a low molecular weight glycol, a high molecular weight diol, and triphenylmethane triisocyanate, a polyamine resin, and mixtures thereof, etc.

Suitable examples of these resins which can be used are described in Japanese Patent Publication Nos. 8103/1964, 9779/1965, 7192/1966. 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210 3,781,211, etc.

These binders can be used individually or in combination with each other, and other additives can be added to the binders. The weight ratio of the ferromagnetic powder to the binder is generally about 100 : 10 to 100 : 200. When the proportion of the binder is less than about 10 parts by weight, the ability of the binder to bind the fine ferromagnetic powder becomes weak, and the ferromagnetic powder tends to come off from the magnetic layer. This leads to the disadvantage that the fine ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

In addition to the above described binder and ferromagnetic fine powder, additives such as a dispersing agent, a lubricant, an abrasive, an antistatic agent, and the like can be used in the magnetic recording layer.

Suitable dispersing agents are fatty acids containing about 12 to 18 carbon atoms (e.g., having the formula $R_1COOH$ wherein $R_1$ is an alkyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally employed in a proportion of about 0.5 to 20 parts by weight per 100 parts by weight of the binder. Suitable dispersing agents are described in Japanese Patent Publication Nos. 28,369/1964, 17.945/1969 and 15,001/1973 and U.S. Pat. Nos. 3,387,993 and 3,470,021.

Suitable lubricants which can be used include silicone oils, graphite, molybdenum disulfide, tungsten disulfide, fatty acid esters produced from a monocarboxylic acid conaining about 12 to 16 carbon atoms and a monovalent alcohol containing about 3 to 12 carbon atoms, fatty acid esters produced from a monocarboxylic fatty acid containing about 17 or more carbon atoms and a monovalent alcohol, in which the total number of carbon atoms ranges from about 15 to 28, and the like. These lubricants are generally used in a proportion of about 0.2 to 20 parts by weight per 100 parts by weight of the binder. These lubricants are described in Japanese Patent Publication No. 23889/1968, Japanese Patent Application (OPI) Nos. 24041/1973, 18482/1973, U.S. Pat. Nos. 3,470,021, 3,492,235, 3,497,411, 3,523,086, 3,625,760, 3,630,772, 3,634,253, 3,642,539, 3,687,725, *IBM Technical Disclosure Bulletin*, Vol. 9, No. 7, page 779 (December 1966), *ELEKTRONIK*, No. 12, page 380 (1961) West Germany, etc.

Typical abrasive agents which can be used include materials generally used, e.g., fused alumina, silicon carbide, chromium oxide, corundum, synthetic corundum, diamond, synthetic diamond, garnet, emery (main component; corundum and magnetite), and the like. Those abrasive agents are used which have an average particle size of about 0.05 to 5μm, preferably about 0.1 to 2 μm. These lubricants are generally used in a proportion of from about 0.5 to 20 parts by weight per 100 parts by weight of the binder. These abrasive agents are described in Japanese Patent Application (OPI) No. 115510/1974, U.S. Pat. Nos. 3,007,807, 3,041,196, 3,293,066, 3,630,910, 3,687,725, British Patent No. 1,145,349, West German Patent (DT-PS) No. 853,211 and 1,001,000 etc.

Antistatic agents which can be used in the present invention, include inorganic materials such as carbon black and organic materials, for example, natural surface active agents such as saponin; nonionic surface active agents such as alkyleneoxide based, glycerin based, glycidol based surface active agents, and the like; cationic surface active agents such as heterocyclic compounds, e.g., higher alkyalmines, quaternary ammonium salts, pyridine, and the like; phosphoniums, sulfoniums, and the like; anionic surface active agents containing acid groups such as carboxylic acid groups, sulfonic acid groups, phosphoric acid groups, sulfate groups, phosphate groups, and the like; amphoteric surface active agents such as sulfates or phosphates of amino acids, amino sulfonic acids, and amino alcohols, and the like; etc. A suitable amount of the inorganic material is about 5% by weight and of the organic material is about 0.5 to 1% by weight, each based on the weight of the ferromagnetic material.

Examples of the surface active agents that can be used as antistatic agents, are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Appliction (OLS) No. 1,942,665, British Patent Nos. 1,077,317, 1,198,450, Ryohei Oda, et al., *Kaimen Kassei Zai no Gosei to so no Oyo (Sunthesis of Surface Active Agents and Their Applications)*, Maki Shoten, Tokyo (1964), A.M. Schwarts et al., *Surface Active Agents*, Interscience Publications Corp., New York (1958), J. P. Sisley et al., *Encyclopedia of Surface Active Agents*, Vol. 2, Chemical Publishing Co., New York (1964), *Kaimen Kassei Zai Binran (Handbook of Surface Active Agents)*, 6th Ed., Sangyo Tosho Co., Tokyo, Dec. 20, 1966, etc.

These surface active agents can be used individually or in combination with each other. These surface active agents are generally used as antistatic agents, but in some cases, they are used for other purposes, for example for improving dispersibility, magentic properties, and lubricity, or as auxiliary coating agents.

The magnetic recording layer is formed by dissolving or dispersing the above described composition in an organic solvent and then coating the resulting solution on a support.

The non-magnetic support can have a thickness of about 3 to 50 μm, preferably 10 to 40 μm. If the thickness is less than about 3 μm, the tensile strength of the support required as a magnetic recording material decreases, and the support tends to break or deform. If the thickness exceeds about 50 μm, the volume and weight of the magnetic recording material increase, and therefore, the recording density per unit volume or weight decreases. Suitable materials which can be used for producing the support, are polyesters such as polyethylene terephthalate, polyethylene-2,6-nahthalate, and the like, polyolefins such as polypropylene, and the like cellulose derivatives such as cellulose triacetate, cellulose diacetate, and the like, polycarbonate, etc.

The support can be subjected to the so-called back coating of the surface opposite to that having the magnetic layer thereon, for the purpose of preventing charging, magnetic print through and so on. Suitable back coating techniques which can be used are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, and 3,166,688.

The magnetic recording layer can be coated on the support using coating methods such as air doctor coating, blade coating, air knife coating, squeeze coating, dip coating, reverse roll coating, transfer roll coating, gravure coating, kiss coating, cost coating, spray coating, and the like, and other methods can be also used. These methods are described in *Coating Kogaku (Coating Engineering)*, pages 253 to 277, published by Asakura Shoten, Tokyo (Mar. 20, 1971).

The coating thickness is ordinarily 0.5 to 10 microns, preferably 0.8 to 6 microns on dry base.

Typical organic solvents which can be used in the present invention include ketones, e.g., acetone, methyl ethyl ketone, methyl isobutyl ketone, cyclohexanone, and the like; alcohols, e.g., methanol, ethanol, propanol, butanol, and the like; esters, e.g., methyl acetate, ethyl acetate, butyl acetate, ethyl lactate, glycol monoethyl ether acetate, and the like; ethers and glycol ethers, e.g., diethyl ether, glycol monoethyl ether, glycol dimethyl ether, dioxane, and the like; aromatic hydrocarbons, e.g., benzene, toluene, xylene, and the like; chlorinated hydrocarbons, e.g., methylene chloride, ethylene choride, carbon tetrachloride, chloroform, ethylene chlorohydrin, dichlorobenzene, and the like, tetrahydrofuran, dimethyl sulfoxide, etc., and these solvents can be used individually or in combination with each other.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960, and 2,681,138; Japanese Patent Publication Nos. 3427/1964, 28368/1964, 23624/1965, 23625/1965; 13181/1966, 13043/1973 and 39722/1973. If required, the magnetic layer can be subjected to a surface-smoothening treatment, or cut to the desired shape, thereby to form the magnetic recording material of this invention. Suitable surface-smoothening techniques are disclosed U.S. Pat. Nos. 2,688,567, 2,998,325, and 3,783,023, and German Patent Application (OPI) No. 2,405,222.

In the above orienting treatment for the magnetic layer, the orienting magnetic field can be either an AC or DC magnetic field with a field strength of about 500 to 2000 gauss. The drying temperature can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min, the operating efficiency is low, and if the rate is above about 120 meters/min., the operation is difficult.

The present invention will be explained in detail with reference to the following examples. It will be obvious to one skilled in the art that various changes and modifications can be made in the components, ratios, operational order, and the like without departing from the spirit of the present invention. Therefore the present invention should not be construed as being limited to the following examples.

All parts, percents, ratios and the like are by weight unless otherwise indicated.

EXAMPLE 1

1 mol/l of sodium borohydride was added to an aqueous solution containing 0.85 mol/l of ferrous chloride, 0.10 mol/l of cobalt chloride and 0.05 mol/l of chromium chloride to obtain a ferromagnetic metal powder. The resulting metal powder had a composition of Fe : Co : Cr = 85 : 10 : 5 in addition to a small amount of B and a mean diameter of 250 A. 300 parts of the ferromagnetic metal fine powder was adequately washed with water to remove the residual ions (electrical conductivity of washing water = 250 $\mu v$/cm). The resulting slurry consisting of 2,000 parts of water and 300 parts of the ferromagnetic metal powder was mixed with 6,000 parts of butyl acetate and then subjected to distillation using a distillation apparatus provided with a rectifying column to thus remove the water as an azeotropic mixture of water and butyl acetate, thus obtaining a dispersion consisting of 300 parts of the ferromagnetic metal powder and 800 parts of butyl acetate. The water content of the ferromagnetic metal powder obtained in this way was 0.05% by weight.

To this dispersion was added 400 parts of butyl acetate and further were added 30 parts of a polyester polyurethane (molecular weight = about 30,000), 35 parts of nondrying oil-modified alkyd resin (oil length = 25%) and 2 parts of silicone oil. The mixture was ball milled for 10 hours and then mixed with 22 parts of a polyisocyanate compound (Commercial Name: Colonate L manufactured by Nippon Polyurethane Co.), followed by high speed shearing dispersion for 1 hour, to prepare a magnetic paint. This paint was filtered by a filter having a mean pore size of 3 microns, coated onto a polyethylene terephthalate film having a thickness of 25 microns while applying a magnetic field to thus give a coating thickness of 3 microns on dry base and then heated and dried. The magnetic tape obtained in this way was subjected to a super-calendering treatment and slit in a width of ½ inch, thus obtaining a video tape (Sample No. 1).

EXAMPLE 2

300 parts of the same ferromagnetic metal fine powder as used in Example 1 was adequately washed with water to remove the residual ions (electrical conductivity of washing water = 250 $\mu v$/cm). The resulting slurry consisting of 2,500 parts of water and 300 parts of the ferromagnetic metal powder was mixed with 7,200 parts of butyl acetate and 15 parts of sodium oleate and then subjected to distillation using a distillation apparatus provided with a rectifying column to thus remove the water as an azeotropic mixture of water and butyl acetate, thus obtaining a dispersion consisting of 300 parts of the ferromagnetic metal powder and 700 parts of butyl acetate. The water content of the ferromagnetic metal powder obtained in this way was 0.10% by weight.

500 parts of butyl acetate was added to this dispersion and then a magnetic tape (Sample No. 2) was prepared in an analogous manner to Example 1.

EXAMPLE 3

300 parts of the same ferromagnetic metal powder as used in Example 1 was adequately washed with water to remove the residual ions. The resulting slurry consisting of 1,500 parts of water and 300 parts of the ferromagnetic metal powder was mixed with 3,500 parts of m-xylene and then subjected to distillation using a distillation apparatus provided with a rectifying column to thus remove the water as an azeotropic mixture of water and m-xylene, thus obtaining a dispersion consisting of 300 parts of the ferromagnetic metal powder and 600 parts of m-xylene. The water content of the ferromagnetic metal powder obtained in this way was 0.03% by weight.

600 parts of butyl acetate was added to this dispersion and then a magnetic tape (Sample No. 3) was prepared in an analogous manner to Example 1.

COMPARATIVE EXAMPLE 1

300 parts of the same ferromagnetic metal powder as obtained in Example 1 was adequately washed with water to remove the residual ions (washing water : similar to that of Example 1). The resulting slurry consisting of 2,000 parts of water and 300 parts of ferromagnetic metal powder was washed with 17,400 parts of acetone six times to remove the water and further washed with 6,600 parts of butyl acetate three times. The water content in the butyl acetate was 0.2% at the last washing.

Butyl acetate was added to this washed metal fine powder so that the quantity of butyl acetate was 1,200 parts and then a magnetic tape (Sample No. 4) was prepared in an analogoud manner to Example 1.

COMPARATIVE EXAMPLE 2

300 parts of the same ferromagnetic metal powder as obtained in Example 1 was washed with water adequately to remove the residual ions (washing water : similar to that of Example 1). The resulting cake consisting of 1,200 parts of water and 300 parts of the ferromagnetic metal powder was subjected to heating and drying at 110° C by means of a drier filled with $N_2$ gas fed constantly. 1,200 parts of butyl acetate was added to 300 parts of the resulting ferromagnetic metal powder and then a magnetic tape (Samle No. 5) was prepared in an analogous manner to Example 1. In this example, there was found some clogging of the magnetic paint on the filter.

The comparative test results of Samples obtained in Examples of the present invention and Comparative Examples are tabulated in Table 1 and Table 2.

Table 1

BH Properties of Samples
(Measured in the orientation direction in
an external magnetic field of 2000
oersteds)

| Sample No. | Bm (Gauss) | Br/Bm | Hc (Oersted) |
|---|---|---|---|
| 1 | 3200 | 0.82 | 960 |
| 2 | 3100 | 0.84 | 960 |
| 3 | 3200 | 0.82 | 960 |
| 4 | 2610 | 0.82 | 980 |
| 5 | 3050 | 0.78 | 900 |

Table 2

Tests By Video Recorder and Other Tests

| Sample No. | Surface Property[1] (Reflectivity) | | 5 MHz Output (dB)[2] | Adhesion to Head [3] | Wear Resistance [4] | Falling Off of Magnetic Layer [5] |
|---|---|---|---|---|---|---|
| 1 | Very Smooth | (113%) | +1.4 | No | Very Good | No |
| 2 | " | (124%) | +1.7 | No | " | No |
| 3 | " | (110%) | +1.2 | No | " | No |
| 4 | Smooth | (100%) | +0.0 | Found | Not good | Found |
| 5 | Not good | (72%) | −2.3 | Found | Good | Found |

Test [1]Judged by eye measurement and surface reflectivity meter (reflectivity of Sample No. 4 = 100 %).
[2]Sensitivity of non-bias Recording of 5 MHz, Sample No. 4: Standard.
[3]Judged by wiping the head with an alcohol-soaked gauze after running for 10 minutes.
[4]Tape durability was examined after playing back of still made for 30 minutes.
[5]Judged by the quantity of a magnetic layer adhered to an alcohol-soaked gauze. A tape of 100 meters in length was reciprocatedly contacted with a dummy head at a rate of 2.5 m/sec one hundred times and then the dummy head was wiped by the gauze.

As apparent from the above described Examples, a magnetic tape having a more excellent surface smoothness, durability and magnetic property can be obtained by the water removal treatment according to the present invention than that of the prior art.

In Sample No. 4, the saturated magnetization is considered to be decreased during the washing and in Sample No. 5, the magnetic powder is considered to be aggregated during the drying step. This aggregate is not sufficiently unfastened even during the blending or ball milling step, resulting in lowering of the surface smoothness of a tape.

What is claimed is:

1. A process for the production of a magnetic recording substance comprising a support and a magnetic layer containing a ferromagnetic metal powder in a binder, which process comprises:
   a. reducing a ferromagnetic metal salt in aqueous solution with a reducing agent to produce a ferromagnetic metal powder, said ferromagnetic metal powder containing 50% by weight of one or more of at least one metal selected from the group consisting of Fe, Co, Ni, Fe-Co, Fe-Ni, Co-Ni and Fe-Co-Ni;
   b. forming an aqueous slurry containing said ferromagnetic metal powder in a ratio of powder to water of 100:1 to 1:50 by weight;
   c. adding to said aqueous slurry an organic solvent selected from the group consisting of butyl acetate, m-xylene, isoamyl alcohol, chloroform, butyl ether and methylisobutyl ketone, in a water to organic solvent ratio of 30:1 to 1:100 by weight of said organic solvent to water;
   d. subjecting the resultant mixture of c) to azeotropic distillation to form a minimum boiling azeotrope to thereby substantially remove the water from said slurry and yet leave sufficient organic solvent to form a dispersion of said ferromagnetic powder therein;
   e. dispersing a binder in said dispersion of ferromagnetic metal powder in said organic solvent and
   f. coating the resultant dispersion of e) onto a support.

2. A process according to claim 1 wherein said ferromagnetic metal powder is subjected to an after-treatment comprising heating in an inert atmosphere or in the presence of a trace amount of water or oxygen, prior to step b).

3. The process according to claim 1 wherein said ferromagnetic metal powder further contains 20% by weight or less of at least one member selected from the group consisting of Al, Si, S, Sc, Ti, V, Cr, Mn, An, Y, Mo, Rh, Pd, Ag, Sn, Sb, Te, Ta, Ba, W, Re, Au, Hg, Pb, Bi, La, Ce, Pr, Nd, B, P and mixtures thereof.

4. The process according to claim 1 wherein said binder is at least one material selected from the group consisting of thermoplastic resins and thermosetting resins.

5. The process according to claim 1 wherein said support has a thickness of 2.5 to 100 microns.

6. The process according to claim 1 wherein said support is of a material selected from the group consisting of polyethylene terephthalate, polyethylene naphthalate, polypropylene, cellulose tracetate, cellulose diacetate, polyvinyl chloride, polycarbonate, aluminum, copper and glass.

7. The process according to claim 1 wherein said ferromagnetic powder in step b) is rendered hydrophobic by a surfactant.

8. The process according to claim 7 wherein said surfactant is selected from the group consisting of anioic surfactants, cationic surfactants, nonionic surfactants and amphoteric surfactants.

* * * * *